United States Patent [19]

Bunschoten

[11] Patent Number: 4,640,441

[45] Date of Patent: Feb. 3, 1987

[54] LIQUID-DISPENSING CONTAINER

[75] Inventor: Gerrit K. Bunschoten, Oud Zuilen, Netherlands

[73] Assignee: Lever Brothers Company, New York, N.Y.

[21] Appl. No.: 731,431

[22] Filed: May 7, 1985

[30] Foreign Application Priority Data

May 14, 1984 [GB] United Kingdom ................. 8412297

[51] Int. Cl.⁴ ............................................. B65D 37/00
[52] U.S. Cl. ................................... 222/207; 222/210; 222/215; 222/541
[58] Field of Search ................. 222/94, 107, 205, 206, 222/207, 210, 212, 215, 424.5, 457, 541, 544, 572, 575, 547, 564

[56] References Cited

U.S. PATENT DOCUMENTS

| 3,195,788 | 7/1965 | Wilson | 222/547 X |
| 4,052,986 | 10/1977 | Scaife | 222/541 X |
| 4,055,282 | 10/1977 | Komendowski | 222/421 |
| 4,401,272 | 8/1983 | Merton et al. | 239/337 |
| 4,491,245 | 1/1985 | Jamison | 222/107 |

FOREIGN PATENT DOCUMENTS

| 10965 | 5/1982 | European Pat. Off. . | |
| 582723 | 9/1958 | Italy | 222/207 |
| 7712828 | 5/1979 | Netherlands | 222/207 |
| 2093804 | 9/1982 | United Kingdom | 222/207 |

Primary Examiner—Joseph J. Rolla
Assistant Examiner—Michael S. Huppert
Attorney, Agent, or Firm—Milton L. Honig; James J. Farrell

[57] ABSTRACT

The invention pertains to a liquid-dispensing container which comprises a squeezable reservoir, a dosage chamber, a duct connecting both chambers and a discharge duct which extends from the dosage chamber defining a non-linear flow path for the liquid to be dispensed. The container provides improved safety to the user.

4 Claims, 2 Drawing Figures

U.S. Patent   Feb. 3, 1987   4,640,441
Fig. 1.
Fig. 2.
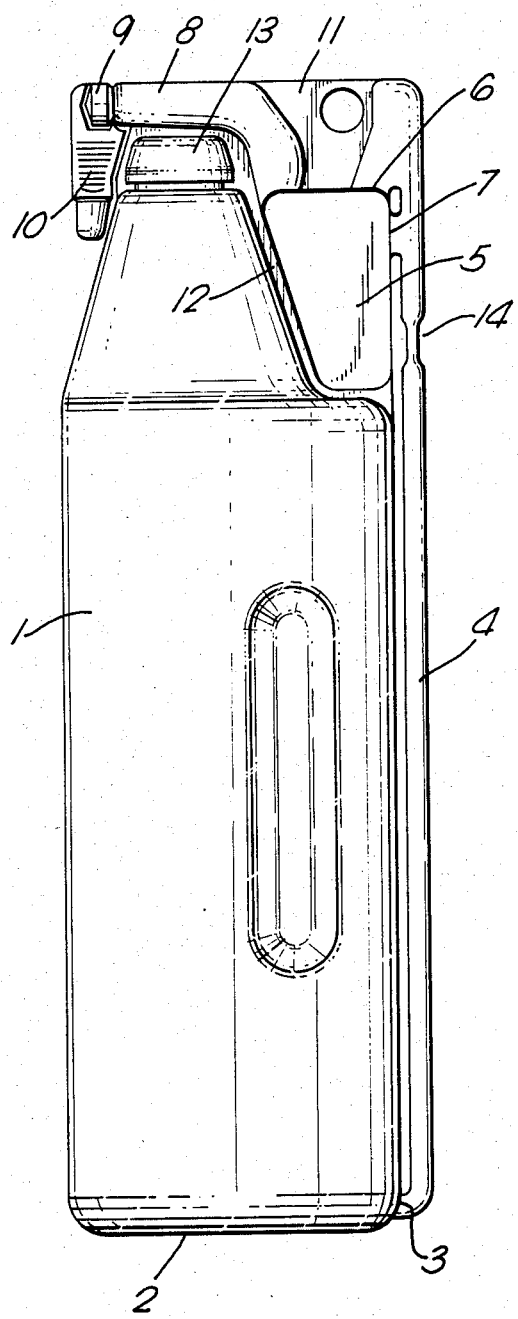
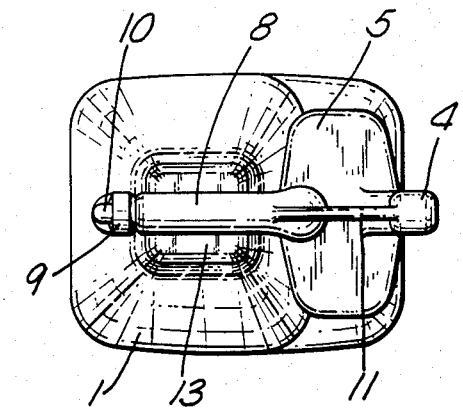

LIQUID-DISPENSING CONTAINER

The present invention relates to a liquid-dispensing container having a means for dispensing a metered quantity of liquid. In particular it relates to a liquid-dispensing container comprising a manually deformable reservoir chamber for holding liquid, a dosage chamber and a duct extending from close to the bottom of the reservoir chamber to the dosage chamber such that liquid can be expressed from the reservoir chamber into the dosage chamber by squeezing the reservoir chamber, all parts of the container being integrally moulded in fixed positional interrelationship.

Such liquid-dispensing container has been proposed in European Pat. No. 0010965. It has been found that the construction described in the European Patent has the drawback that it may easily occur that when squeezing the reservoir chamber during the filling operation of the dosage chamber liquid spatters through the open mouth of the dosage chamber. In particular when dangerous liquids are used, such as e.g. highly alkaline detergent liquids, spattering and spilling may cause safety hazards and therefore are unacceptable.

Accordingly, it is an object of the present invention to provide an improved design of a liquid-dispensing container which overcomes the problem of easy spattering.

It is a further object of the present invention to provide a single mouthed container thereby procuring the user optimal safety and convenience.

It is still a further object of the present invention to provide a container design which enables production by way of blow-moulding, filling and sealing in one operation.

Accordingly, in its broadest aspects the present invention provides a liquid-dispensing container of the above-described type comprising a discharge duct which extends from the dosage chamber, and defines a non-linear flow path for the liquid to be discharged.

In a further aspect the present invention provides such liquid-dispensing container comprising a duct for filling the dosage chamber which is arranged such that it defines a flow path which enters the dosage chambers downwardly inclined.

Although any conventional process of manufacture process may be used, the container is preferably manufactured from thermoplastic materials, such as polyethylene, by way of a simultaneous blow-moulding, filling and sealing process.

In a preferred form of the invention the container is single mouthed, the filling opening of the reservoir being permanently sealed immediately after filling.

In a preferred further embodiment the discharge duct extends horizontally over the sealed mouth of the reservoir chamber, the dosage chamber being positioned on a shoulder of the reservoir chamber. The mouth of the discharge duct is preferably sealed, but if so desired also other types of closures can be used such as e.g. a screw cap.

To further improve the non-spattering behaviour preferably a restriction is incorporated in the dosage chamber filling duct.

The invention will now be described in more detail with reference to the accompanying drawings, in which:

FIG. 1 is a side elevation of a preferred embodiment of a container according to the invention, and FIG. 2 is a plan view from above of the container of FIG. 1.

FIGS. 1 and 2 illustrate a container according to the invention. The container is fabricated from thermoplastic material such as polyethylene, by blow moulding techniques in which an extruded parison is blown into the general shape of the container. The wall thickness of the container is such that the walls are flexible while retaining the fabricated shape of the container. The container walls may be transparent or trans-lucent.

The container comprises a reservoir chamber 1 with close to the bottom 2 thereof an outlet 3 from which a filling duct 4 extends upwardly alongside the reservoir chamber to a dosage chamber 5. The duct 4 opens into dosage chamber 5 through inlets 6 and 7. Inlet 6 is arranged such that a flow path is defined which enters the dosage chamber downwardly inclined. The volume of the dosage chamber and the position of the inlet 7 determine the quantity of liquid which will be dispensed with each discharge. A non-linear discharge duct 8 extends upwardly from the dosage chamber ending in closure seal 9 preferably fitted with wing 10 for easy opening of the seal. The reservoir chamber is fitted with a seal 13. In filling duct 4 a restriction 14 is incorporated which tempers the flow of liquid in the squeezing operation thereby avoiding easy overfilling of the dosage chamber. Preferably the discharge duct 8 extends horizontally over the seal rendering it permanent. Between reservoir chamber 1, dosage chamber 5 and ducts 4 and 8 web portions 11 and 12 which are opposed wall portions pressed and interwelded in the blow moulding process, reinforce the container construction and positionally fix the various parts relative to each other.

The container of the present invention is delivered to the user with the reservoir chamber filled with the liquid to be dispensed and is in general not refillable due to the preferably permanent seal 13. After removing closure seal 9 by turning wing 10, liquid can be expressed from the reservoir chamber 1 through duct 4 into dosage chamber 5 by squeezing reservoir chamber 1. After the dosage chamber is filled, the squeeze on the reservoir chamber is relaxed and superfluous liquid flows back over weir 6 into duct 4 and the reservoir chamber. The measured quantity of liquid in the dosage chamber is finally discharged through duct 8. Due to the non-linear shape of the discharge duct 8 particularly in combination with the downwardly inclined inlet 6 of filling duct 4 spattering or spilling of liquid can not easily occur during the filling of the dosage chamber.

I claim:

1. A liquid-dispensing container comprising a manually deformable reservoir chamber for holding liquid, a dosage chamber, a duct extending from close to the bottom of the reservoir chamber to the dosage chamber such that liquid can be expressed from the reservoir chamber into the dosage chamber by squeezing the reservoir chamber, said duct having a restriction, a discharge duct extending from the dosage chamber and defining a non-linear flow path for the liquid to be discharged, said discharge duct having a first flow channel portion extending away from said dosage chamber and a second flow channel portion inclined substantially perpendicular to said first flow channel from which the dispensed liquid exits the discharge duct, said second flow channel oriented to permit liquid discharge therefrom in a horizontal direction relative to the reservoir chamber, and a closure seal fitted at an end of said second flow channel, all parts of the container being integrally moulded in fixed positional interrelationship.

2. A container according to claim 1, wherein said duct extending from close to the bottom of the reservoir chamber to the dosage chamber defines a flow path which enters said dosage chamber downwardly inclined.

3. A container according to claim 1 or 2 which is single mouthed.

4. A container according to claim 3 wherein the discharge duct extends horizontally over the reservoir chamber, the dosage chamber being positioned on a shoulder of the reservoir chamber.

* * * * *